Jan. 13, 1970   B. H. KENNEY   3,489,197
TIRE VALVE ASSEMBLY
Filed Dec. 27, 1967
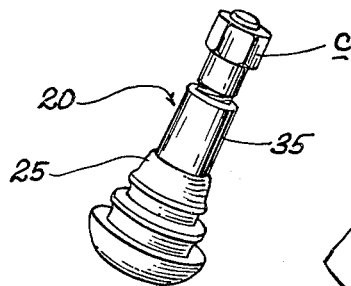
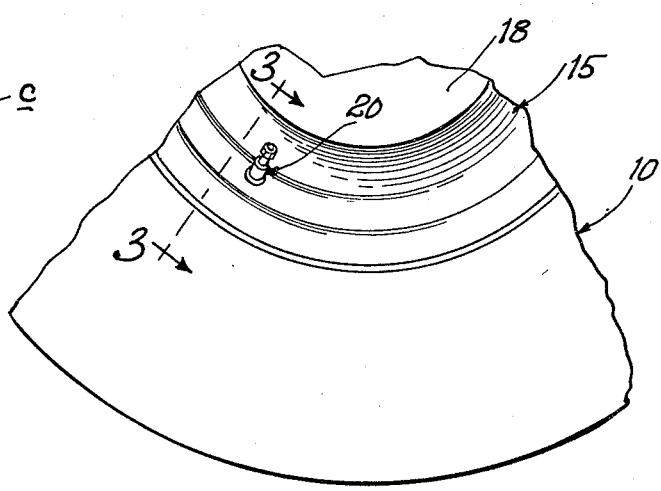
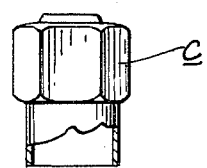
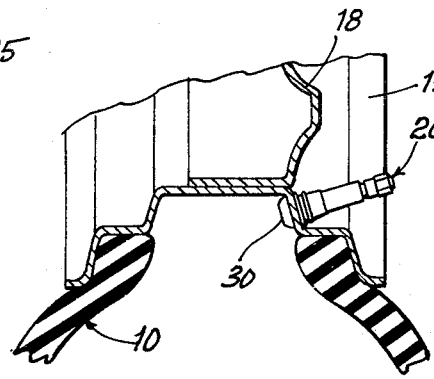
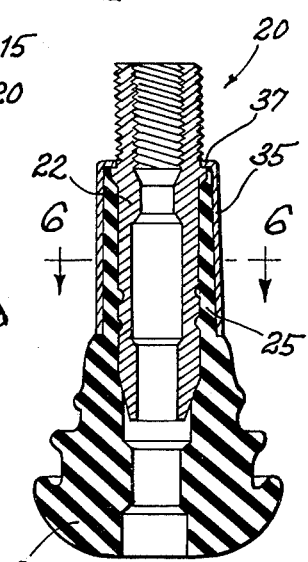
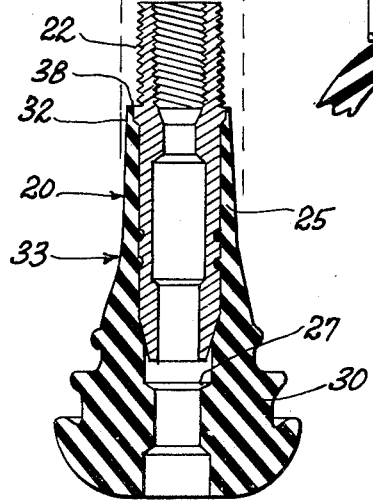
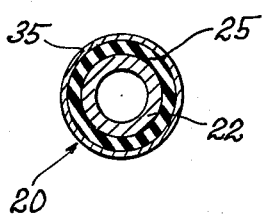
INVENTOR
Brice H. Kenney
Att'ys

United States Patent Office 3,489,197
Patented Jan. 13, 1970

3,489,197
TIRE VALVE ASSEMBLY
Brice H. Kenney, Downers Grove, Ill., assignor to Sears, Roebuck and Co., Chicago, Ill., a corporation of New York
Continuation-in-part of application Ser. No. 575,671, Aug. 29, 1966. This application Dec. 27, 1967, Ser. No. 693,802
Int. Cl. B60c 29/00
U.S. Cl. 152—427      3 Claims

ABSTRACT OF THE DISCLOSURE

A valve assembly for a tubeless tire and method of producing same. The assembly comprises a metal insert onto which is molded a resilient sleeve originally having a frusto-conically tapered end portion over which is forced a metal cylinder which compresses the sleeve to form a secure bond between the sleeve and both insert and cylinder. The cylinder is preferably of non-tarnishable metal harmonizing with the chrome finish of a deluxe automobile.

---

This application is in part a continuation of my co-pending patent application Ser. No. 575,671, filed Aug. 29, 1966, now abandoned.

FIELD OF THE INVENTION

My invention relates to tire valve assemblies and has to do more particularly with a novel combination of a tire valve and a sleeve associated therewith which serves the dual purpose of reinforcing the valve stem and adding considerably to the aesthetic appearance thereof.

My invention relates especially to a valve for a tubeless tire associated with a type of wheel ordinarily mounted on a deluxe automobile. Such a car normally has a rich finish with considerable display of chrome, including chrome-plated or other decorative covers disposed over the hub portion of the wheels to give the latter a rich and attractive finish.

The ordinary pneumatic tire valve stem molded of rubber, synthetic rubber or the like imparts a jarring note to such highly decorative assembly, detracting from the fine aesthetic effect of otherwise excellent design.

A major object of my invention is to overcome this visually distracting situation by imparting a finish to the valve stem which is in harmony with the overall pleasing appearance of the automobile while serving an additional functional purpose of improving the strength and durability of the valve assembly.

THE PRIOR ART

My invention may in a sense be considered an improvement over McCord Patent No. 3,191,655, dated June 29, 1965, which discloses a valve for a tubeless tire characterized by the presence of a molded plastic sleeve applied by injection molding to the outside of a resilient rubber sealing member which in turn is disposed on the outside of a rigid plastic tubular valve member.

In another sense, my invention may be considered an improvement over the so-called Dill tubeless tire valves as disclosed in Boyer Patent No. 2,818,101, dated Dec. 31, 1957, showing a flexible rubber sleeve molded over a tubular metal valve member or insert.

SUMMARY OF THE INVENTION

A major object of my invention is to provide a valve for a tubeless tire which is superior to that disclosed in the McCord patent noted hereabove from both an aesthetic as well as a structural standpoint, may be produced more economically, and is of improved ruggedness and longevity.

A further object is to provide a new and improved method for producing an article of the class described.

Briefly outlined, my invention contemplates a tire valve of the type referred to comprising a tubular metal valve insert having a sleeve of resilient material such as rubber disposed tightly thereon, said yieldable sleeve having a slightly tapering or frusto-conical outer contour in its original condition, and having a decorative and supporting metal cylinder or tube which has been forced over the outside of said yieldable sleeve with sufficient pressure that the metal cylinder will not only be firmly affixed to the yieldable sleeve but will also firmly secure the latter to the metal insert, thus making for an extremely secure, rigid and decorative assembly.

Various other objects and advantages will appear as the description proceeds.

BRIEF DESCRIPTION OF THE DRAWINGS

Referring now to the drawings forming a part of this specification and illustrating a preferred embodiment of my invention, FIG. 1 is a perspective view of a typical valve assembly embodying my invention;

FIG. 2 is a fragmentary elevational view on a reduced scale, showing said valve assembly in place on a tubeless tire mounted on an automobile wheel;

FIG. 3 is a sectional view on an enlarged scale taken substantially along the line 3—3 of FIG. 2;

FIG. 4 is an exploded view, on a further enlarged scale, partly in section and partly in elevation, of parts of the improved valve assembly shown in the drawings;

FIG. 5 is a sectional view of said improved valve corresponding to FIG. 4 after complete assembly thereof, and FIG. 6 is a cross-sectional view taken substantially along line 6—6 of FIG. 5.

DETAILED DESCRIPTION

Referring first to FIGS. 1–3, inclusive, the numeral 10 indicates a tubeless tire of standard or other suitable design mounted on a wheel, indicated generally by the numeral 15 and having an ornamental or decorative hub cap or cover 18 of chrome-plated steel or the like.

The tire 10 is provided with a pneumatic valve indicated generally by the numeral 20 comprising a tubular metal (such as brass or steel) valve insert 22 on which is molded a resilient tubular member 25 formed or rubber, synthetic rubber or other suitable plastic and which is preferably molded onto insert 22 as by injection molding. It will be noted (FIG. 4) that insert 22 extends only partway of the length of molded cylindrical element 25, being spaced a short distance above a shoulder 27 therein, the lower portion of said resilient member 25 being enlarged to form a dome portion 30 seatable in a suitable opening provided in the wheel rim 15, as seen in FIG. 3.

Such formation is standard in tires of the tubeless type. Incidental to the use of such a valve is frequent flexing of the portion protruding out of the rim above dome portion 30.

The upper extremity of flexible tubular member 25, extending from the upper end 32 thereof approximately down to about the point 33 intermediate the ends of said member, at the outer diameter of said member 25 is slightly tapered, expanding in diameter between the end 32 and point 33 by approximately .005 inch in a frusto-conical formation for a purpose now to be described.

In fabrication of the valve assembly, after pickling of insert 22 to improve its bonding capacity, flexible member 25 is molded onto said insert as by injection molding. A cylindrical ornamental sleeve 35 is then forced over said resilient member 25 until it assumes approximately the position seen in FIG. 5.

Inasmuch as the upper portion of member 25 is originally slightly tapered, as described above, while metal sleeve 35 is substantially cylindrical and without appreciable taper, it is necessary that the interface between these elements first be lubricated, by application of a lubricant such as water with or without the addition of soap or other materials, to reduce the friction between resilient member 25 and sleeve 35.

Sleeve 35 is preferably provided with a flange 37 at the upper extremity thereof, and said sleeve 35 is forced down on flexible member 25 until said flange 37 substantially abuts shoulder 38 formed on insert 22, as seen in FIG. 5.

Because of the extremely high pressure required to force the metal sleeve 35 onto resilient member 25, by reason of the original conical taper in the upper part of member 25, said member 25 will be forced into extremely tight union with insert 22, rendering these elements substantially inseparable, despite any amount of repeated flexing of the assembly outside the wheel incidental to introduction of air into the tire.

The usual cap nut C may be attached to the threaded end of insert 22, which is also preferably polished metal such as chrome or nickel plate or the like, for consistency with the other valve elements.

It will be seen that sleeve 35 extends over a major portion of the length of resilient member 25 which is exposed beyond the rim, adding an attractive ornamental feature of dress to the wheel assembly.

Although I have mentioned chrome metal as the preferred material for sleeve 35, it will be understood that other types of non-tarnishable metal may be substituted therefor, such as nickel plate, stainless steel, etc.

Various changes coming within the spirit of my invention may suggest themselves to those skilled in the art; hence, I do not wish to be limited to the specific embodiment shown and described or uses mentioned, but intend the same to be merely exemplary, the scope of my invention being limited only by the appended claims.

I claim:

1. In a valve assembly for a tubeless tire mounted on a wheel rim,
    (a) a tubular metal insert,
    (b) a resilient tubular member molded onto said insert including a dome portion extending beyond the end of said metal insert which is disposable within the interior of said wheel rim adjacent to the tubeless tire, with the major portion of said member having a smooth lateral surface extending outwardly from an opening in the wheel rim,
    (c) said originally molded smooth lateral surface remote from said dome portion being of frusto-conical formation with a slight taper relative to the longitudinal axis of said resilient member, and
    (d) a substantially cylindrical metallic sleeve of lesser length than said resilient member projecting from the rim, said sleeve being tightly compressed around the major portion of said resilient member at said tapered portion remote from said dome portion, to securely bond said insert, resilient member and sleeve, while providing an intermediate portion of said member which may be flexed relative to the rim without disturbing the pressed fitting of the component parts.

2. A device as set forth in claim 1, wherein said metallic sleeve is formed of a high-strength decorative and non-tarnishable metal.

3. A device as set forth in claim 2, wherein said metal insert is provided with a shoulder at an intermediate point in the external surface thereof, and an internal annular flange on said metallic sleeve at the end thereof remote from the wheel rim, said flange abutting against the said shoulder and free outer end of said resilient tubular member at the final compression of the component parts.

References Cited

UNITED STATES PATENTS

| | | | |
|---|---|---|---|
| 2,928,448 | 3/1960 | Hosking | 152—427 |
| 1,036,085 | 8/1912 | Falor | 152—427 |
| 2,145,218 | 1/1939 | Broecker | 152—427 |
| 2,744,559 | 5/1956 | Leonetti | 152—427 |
| 3,191,655 | 6/1965 | McCord | 152—427 |
| 2,928,448 | 3/1960 | Hosking | 152—427 |

FOREIGN PATENTS 285,026   4/1931   Italy.

ARTHUR L. LA POINT, Primary Examiner

CHARLES B. LYON, Assistant Examiner